United States Patent
Rogers

[11] Patent Number: 6,160,668
[45] Date of Patent: Dec. 12, 2000

[54] OPTICAL SYSTEMS

[75] Inventor: Philip Rogers, Denbighshire, United Kingdom

[73] Assignee: Pilkington PE Limited, Wales, United Kingdom

[21] Appl. No.: 09/313,065

[22] Filed: May 17, 1999

[30] Foreign Application Priority Data

May 15, 1998 [GB] United Kingdom .................... 9810339

[51] Int. Cl.⁷ .................................................. G02B 15/02
[52] U.S. Cl. ............................................ 359/674; 359/672
[58] Field of Search ................................... 359/672, 673, 359/674, 675

[56] References Cited

U.S. PATENT DOCUMENTS

| | | |
|---|---|---|
| 4,148,548 | 4/1979 | Thompson . |
| 4,596,447 | 6/1986 | Yamada et al. . |
| 4,708,442 | 11/1987 | Fujii et al. . |
| 5,050,971 | 9/1991 | Sato .......................................... 359/675 |

FOREIGN PATENT DOCUMENTS

| | | |
|---|---|---|
| 1154785 | 6/1969 | United Kingdom . |
| 1559514 | 1/1980 | United Kingdom . |

*Primary Examiner*—Georgia Epps
*Assistant Examiner*—Michael A. Lucas
*Attorney, Agent, or Firm*—Alston & Bird LLP

[57] ABSTRACT

A switchable dual field of view objective system 20 comprises a front lens A and a rear lens C with an intermediate lens B switchable between in-use and out-of-use positions. Lens A is positively powered and lens C is negatively or positively powered but has little power in comparison to lens A. Lens C has two lens components 24, 25 of which component 24 is negatively powered and is located proximal to intermediate lens B. Lens B and component 24 are carried in common by a carrier 28 which is movable along the axis to provide distance focussing in both fields of view.

6 Claims, 1 Drawing Sheet

OPTICAL SYSTEMS

FIELD OF THE INVENTION

This invention related to optical systems and in particular to switchable dual field of view objective systems.

BACKGROUND OF THE INVENTION

It is well known that the basic configuration for a switchable dual field of view objective system is that of a front lens and a rear lens spaced apart along a common optical axis with an intermediate lens switchable between an in-use position when the intermediate lens is located on-axis intercepting the ray envelope between the front and rear lenses, and an out-of-use position when the intermediate lens is located out of the ray envelope between the front and rear lenses. The intermediate lens itself is usually formed by separate lens elements.

It is an object of the present invention to provide a compact form of switchable dual field of view objective system with minimal number of lens elements so that it is light in weight and with a simple arrangement providing common field of view focusing for varying object distances at varying temperatures.

SUMMARY OF THE INVENTION

According to the present invention there is provided a switchable dual field of view objective system comprising a front lens and a rear lens spaced apart along a common optical axis with an intermediate lens switchable between an in-use position when the intermediate lens is located on-axis intercepting the ray envelope between the front and rear lenses and an out of use position when the intermediate lens is located out of the ray envelope between the front and rear lenses, wherein the rear lens has relatively little power in comparison to the front lens and comprises a negatively-powered lens component which is proximal to the intermediate lens and a positively-powered lens component which is distal to the intermediate lens, and the intermediate lens and the negatively-powered lens component are carried in common by a first carrier which is axially movable to provide distance focusing of the objective system for each of its fields of view, and the positively powered lens component is mounted on a second carrier which is axially movable to athermalise the objective system for each of its fields of view.

Preferably the first carrier is mechanically connected to an operator-activated drive unit whereas the second carrier is connected to a passive drive unit for achieving athermalisation automatically. Conveniently the passive drive unit is activated by thermally sensitive bimetallic strips, high/low expansion rods, or plastic mounting materials, in a manner which is known per se.

Preferably the front lens is achromatised. For example, it may be a single lens element incorporating a diffractive surface and/or an aspheric or it may be pair of lens elements made of different materials.

Preferably the rear lens is negatively powered so that the system is shorter than the classical 2-element Petzval configuration with moderate off-axis performance of the objective system. Alternatively the rear lens is positively powered to achieve improved off-axis performance of the objective system.

Preferably the objective system is transmissive in the thermal infra-red waveband and the lenses are made of appropriate infra-red transmitting materials. Conveniently all of the lenses are made of Germanium.

BRIEF DESCRIPTION OF THE DRAWINGS

An embodiment of the present invention will now be described by way of example with reference to the accompanying drawing in which.

DETAILED DESCRIPTION OF THE PREFERRED EMBODIMENT

Figure 1:
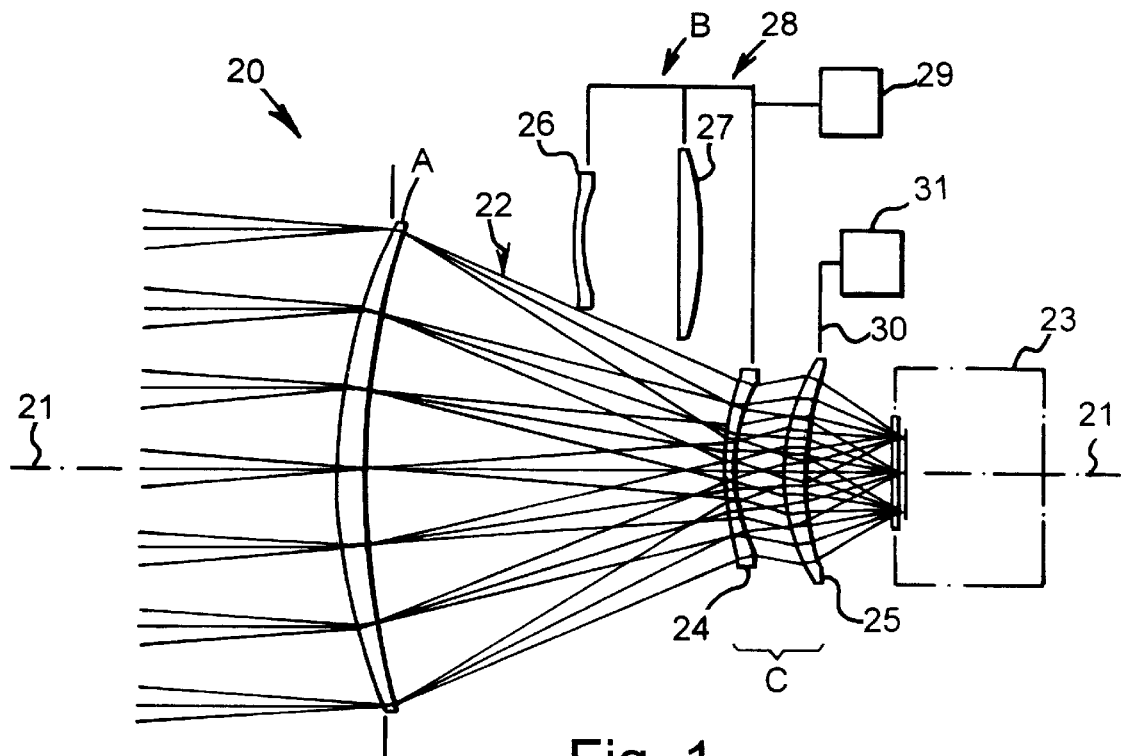
FIG. 1 illustrates a switchable dual field of view objective system in its narrow field setting.
Figure 2:
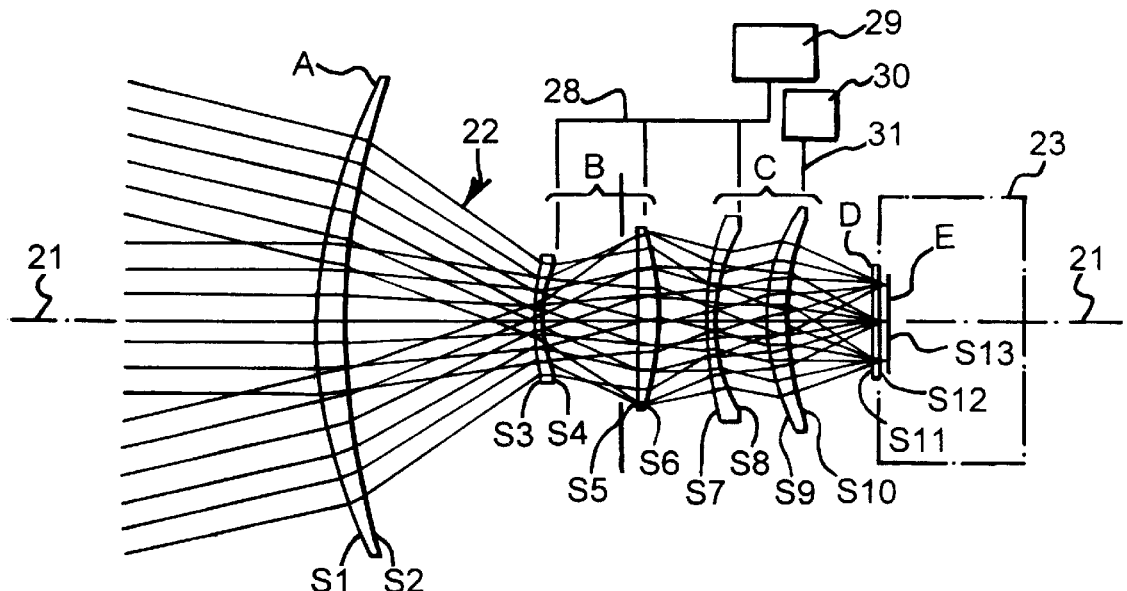
FIG. 2 illustrates the FIG. 1 system in its wide field setting.

As is shown in the drawing a switchable dual field of view objective system 20 comprises a front lens A and a rear lens C spaced apart along a common optical axis 21 with an intermediate lens B switchable between an in-use position shown in FIG. 2 when lens B is located on-axis intercepting the ray envelope 22 between the lenses A and C and an out-of-use position shown in FIG. 1 when lens B is located out of the ray envelope 22.

The system 20 is arranged to produce a real image at a focal plane E where the surface of a detector is located, the detector forming part of a thermal detection system 23 which is sensitive to radiation in the thermal infra-red waveband, particularly 8–12 $\mu$m, so that the objective system forms part of a thermal imager. The detection system 23 includes a window D for receiving the image-forming radiation and may be cooled or uncooled. Uncooled systems 23 are comparatively insensitive which means that the system 20 should have a high numerical aperture.

The front lens A is positively powered and the rear lens C, which has two lens components 24, 25, has relatively little power in comparison but may be either positively or negatively powered. When it is negatively powered the system 20 is shorter than the classical 2-element Petzval configuration and provides moderate off-axis performance in that at the edges of the image in the focal pane E the performance is of the order 60% of the diffraction limited performance. The classical Petzval length is 1.4×focal length whereas components 24, 25 enable a length in the range 1.0 to 1.25×focal length.

When lens C is positively powered the system 20 although longer than the classical 2 element Petzval configuration provides significantly improved off-axis performance in that at the edge of the image in the focal plane E the performance is of the order 75% of the diffraction limited performance. In both positively and negatively powered cases lens C may incorporate one or more aspheric surfaces to give enhanced off-axis correction.

The lens component 24 (having refraction surfaces S7, S8) is negatively powered and is proximal to the intermediate lens B whilst lens component 25 (having refractive surfaces S9, S10) is positively powered and is distal to lens B.

Intermediate lens B and the negatively powered component 24 are carried in common by a first carrier 28 which is movable along axis 21 to provide distance focusing for the system 20 both in its narrow field of view (FIG. 1) and in its wide field of view (FIG. 2) from which it will be understood that movement of intermediate lens B between its in-use and out-of-use positions is independent of the axial location of the carrier 28. The carrier 28 is mechanically connected to an operator-activated drive unit 29 so that an operator can move the carrier 28 in the axial direction to provide distance focusing of the system 20 for each of its fields of view. Accordingly there is no requirement to refocus the system 20 when switching fields of view whatever the distance of the object.

The positively-powered lens component 25 is mounted on a second carrier 30 which is axially movable via drive unit 31 to athermalise the system 20 for each of its fields of view. Drive unit 31 may be active, i.e., arranged for manual actuation by an operator but preferably it is passive and actuated by thermally sensitive components to move automatically without operator intervention. These thermally-sensitive components may take any know form such as bimetallic strips.

The intermediate lens B is formed by separate lens elements 26, 27 having refractive surfaces S3, S4 and S5, S6 respectively.

The front lens A is preferably achromatised and when lens A is a single element (having refractive surfaces S1 and S2) as illustrated this may be achieved by having its innermost refractive surface S2 incorporating a diffractive surface superimposed on an aspheric. Alternatively lens A may be made of two lens elements in doublet form, the elements being made of different materials.

A specific numerical example of an objective system in accordance with the present invention is set forth in Table I hereto. The Table I system in its narrow angle setting (FIG. 2) has a focal length of 177 mm and a field of view of 6° and in its wide angle setting has a focal length of 60 mm and a field view of 18.4°. Refractive surfaces S2, S4, S5, S6, S7 and S10 are asperics with the parameters given in Table I and surface S2 additionally carries a surface-relief hologram designed according to a phase function having a construction wavelength of 9.6 μm with the beam diffracted into Order 1. The phase function correlates the optical path difference (OPD) with the distance Y from the surface vertex according to the equation:

$$OPD = h_2 Y^2 + h_4 Y^4 + h_6 Y^6 + h_8 Y^8 + h_{10} Y^{10}$$

where

| | |
|---|---|
| $h_2 = -0.69377 \times 10^{-9}$ | $h_6 = +0.24452 \times 10^{-13}$ |
| $h_4 = -0.69095 \times 10^{-9}$ | $h_8 = +0.36506 \times 10^{-16}$ |
| | $h_{10} = -0.46368 \times 10^{-20}$ |

TABLE I

| Item | Material | Surface | Radius | Separation |
|---|---|---|---|---|
| A | Ge | S1 | +198.7 | 0.000 |
| | | S2 | +328.5* | 8.0 |
| 26 | Ge | S3 | −77.9 | 89.0 |
| | | S4 | +289.5* | 1.99 |
| 27 | Ge | S5 | +101.0* | 21.4 |
| | | S6 | −190.8* | 4.1 |

TABLE I-continued

| Item | Material | Surface | Radius | Separation |
|---|---|---|---|---|
| 24 | Ge | S7 | +138.9* | 9.3 |
| | | S8 | +56.03 | 2.2 |
| 25 | Ge | S9 | +53.9 | 18.8 |
| | | S10 | +110.0* | 4.9 |
| D | Ge | S11 | Plano | 24.9 |
| | | S12 | Plano | 1.3 |
| E | | S13 | Plano | 1.3 |

Surfaces S2, S4, S5, S6, S7 and S10 are aspheric surfaces defined by the equation $$Z = \frac{CY^2}{1 + \sqrt{(1-(1+K)C^2Y^2)}} + \alpha Y^4 + \beta Y^6 + \gamma Y^8$$

where Z=surface sag, C=radius$^{-1}$, Y is the distance from the surface vertex and K, α, β, and γ are the following coefficients:

| | c | K | α | β | γ |
|---|---|---|---|---|---|
| S2 | +0.30442 × 10$^{-2}$ | +6.1540 | −0.14045 × 10$^{-9}$ | −0.6483 × 10$^{-10}$ | −0.3012 × 10$^{-10}$ |
| S4 | +.34546 × 10$^{-3}$ | 1.0 | −.62610 × 10$^{-6}$ | .25483 × 10$^{-8}$ | 0.0 |
| S5 | +.96958 × 10$^{-2}$ | −8.2033 | −.60032 × 10$^{-6}$ | +.77142 × 10$^{-10}$ | 0.0 |
| S6 | −.52407 × 10$^{-3}$ | 1.0 | −.21985 × 10$^{-1}$ | +.122185 × 10$^{-10}$ | 0.0 |
| S7 | +.71569 × 10$^{-3}$ | 1.0 | +.55412 × 10$^{-4}$ | −.29832 × 10$^{-3}$ | 0.0 |
| S10 | +.90818 × 10$^{-3}$ | 1.0 | +.51605 × 10$^{-4}$ | −.10716 × 10$^{-3}$ | 0.0 |

What is claimed is:

1. A switchable dual field of view objective system comprising a front lens and a rear lens spaced apart along a common optical axis with an intermediate lens switchable between an in-use position when the intermediate lens is located on-axis intercepting the ray envelope between the front and rear lenses and an out of use position when the intermediate lens is located out of the ray envelope between the front and rear lenses, wherein the rear lens has relatively little power in comparison to the front lens and comprises a negatively-powered lens component which is proximal to the intermediate lens and a positively-powered lens component which is distal to the intermediate lens, and the intermediate lens and the negatively-powered lens component are carried in common by a first carrier which is axially movable to provide distance focusing of the objective system for each of tis field of view, and the positively powered lens component is mounted on a second carrier which is axially movable to athermalise the objective system for each of its fields of view.

2. An objective system as claimed in claim 1, wherein the first carrier is mechanically connected to an operator-activated drive unit whereas the second carrier is connected to a passive drive unit for achieving athermalisation automatically.

3. An objective system as claimed in claim 2, wherein the passive drive unit is activated by any one of thermally sensitive bimetallic strips, high/low expansion rods, or plastic mounting materials, in a manner which is known per se.

4. An objective system as claimed in claim 1, wherein the front lens is achromatised.

5. An objective system as claimed in claim 1, wherein the rear lens is negatively powered so that the system is shorter than the classical 2-element Petzval configuration with moderate off-axis performance of the objective system.

6. An objective system as claimed in claim 1 wherein the rear lens is positively powered to achieve improved off-axis performance of the objective system.

\* \* \* \* \*

UNITED STATES PATENT AND TRADEMARK OFFICE
CERTIFICATE OF CORRECTION

PATENT NO. : 6,160,668
DATED : December 12, 2000
INVENTOR(S) : Rogers It is certified that error appears in the above-identified patent and that said Letters Patent is hereby corrected as shown below:

Col. 3, line 54, "$h2 = -0.69377 \times 10-9$" should read -- $h2 = -0.69377 \times 10-5$ --.

Col. 4, after line 26, in the chart,

Col. c in the chart, line 2, "$+.34546 \times 10-3$" should read -- $+.34546 \times 10-2$ --;

line 3, "$+.96958 \times 10-2$" should read -- $+.98958 \times 10-2$ --;

line 4, "$-.52407 \times 10-3$" should read -- $-.52407 \times 10-2$ --;

line 5, "$+.71569 \times 10-3$" should read -- $+.71969 \times 10-2$ --;

line 6, "$+.90818 \times 10-3$" should read -- $+.90918 \times 10-2$ --.

Col. K in the chart, line 3, "$-8.2033$" should read -- $-8.3033$ --;

Col. $\alpha$ in the chart, line 1, "$-0.14045 \times 10-6$" should read -- $-0.14045 \times 10-7$ --;

line 4, "$-.21985 \times 10-1$" should read -- $-.21985 \times 10-6$ --;

line 5, "$+.55412 \times 10-4$" should read -- $+.55412 \times 10-6$ --;

line 6, "$+.51605 \times 10-4$" should read -- $+.31605 \times 10-6$ --.

UNITED STATES PATENT AND TRADEMARK OFFICE
CERTIFICATE OF CORRECTION

PATENT NO. : 6,160,668

DATED : December 12, 2000

INVENTOR(S) : Rogers

It is certified that error appears in the above-identified patent and that said Letters Patent is hereby corrected as shown below:

Col. ß in the chart, line 1 "-0.6483 x 10-10" should read -- -0.6483 x 10-12 --;

line 2, ".25483 x 10-8" should read -- .26483 x 10-8 --;

line 4, "+.122185 x 10-10" should read -- +.12185 x 10-10 --;

line 5, "-.29832 x 10-3" should read -- -.29832 x 10-9 --;

line 6, "-.10716 x 10-3" should read -- -.10716 x 10-9 --;

Col. γ in the Chart, line 1, "-0.3012 x 10-10" should read -- -0.3012 x 10-16 --.

Col. 4, line 55 "tis" should read -- its --; "field" should read -- fields --.

Signed and Sealed this

Eighth Day of May, 2001

*Attest:*

NICHOLAS P. GODICI

*Attesting Officer*   *Acting Director of the United States Patent and Trademark Office*